J. SAJDA & M. SKAPICK.
DIRIGIBLE AUTOMATIC HEADLIGHT.
APPLICATION FILED JULY 22, 1915.

1,163,266.

Patented Dec. 7, 1915.
2 SHEETS—SHEET 1.

Inventors
J. Sajda
M. Skapich

By A. M. Wilson
Attorney.

J. SAJDA & M. SKAPICK.
DIRIGIBLE AUTOMATIC HEADLIGHT.
APPLICATION FILED JULY 22, 1915.

1,163,266.

Patented Dec. 7, 1915.
2 SHEETS—SHEET 2.

Inventors
J. Sajda
M. Skapick

By H. M. Wilson,
Attorney.

UNITED STATES PATENT OFFICE.

JUSTIN SAJDA AND MATTHEW SKAPICK, OF LANSFORD, PENNSYLVANIA.

DIRIGIBLE AUTOMATIC HEADLIGHT.

1,163,266. Specification of Letters Patent. Patented Dec. 7, 1915.

Application filed July 22, 1915. Serial No. 41,378.

*To all whom it may concern:*

Be it known that we, (1) JUSTIN SAJDA and (2) MATTHEW SKAPICK, (1) a subject of the King of Hungary, (2) a citizen of the United States of America, residing at Lansford, in the county of Carbon and State of Pennsylvania, have invented certain new and useful Improvements in Dirigible Automatic Headlights, of which the following is a specification.

This invention relates to certain new and useful improvements in dirigible automatic head lights.

An object of the present invention is to provide dirigible head lights for automobiles and similar vehicles in which the head lights are operatively connected to the steering mechanism so that when the front wheels of the vehicle turn to either the right or left the lights will automatically turn to cast rays in direct line with the steering wheels.

With these general objects in view and others that will appear as the nature of the invention is better understood, the same consists in the novel combination and arrangement of parts hereinafter fully described, illustrated in the accompanying drawings and then claimed.

Figure 1:
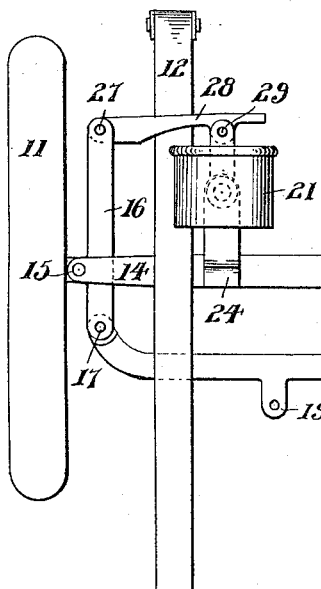
Figure 1:
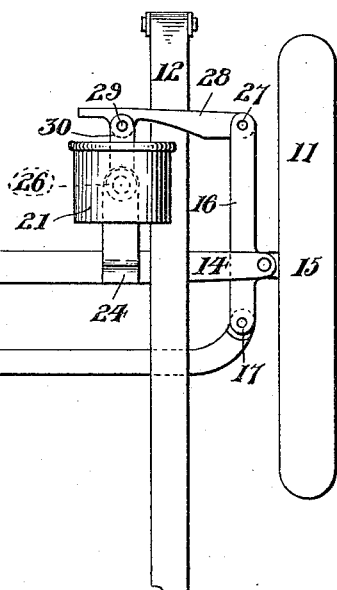
Figure 2:
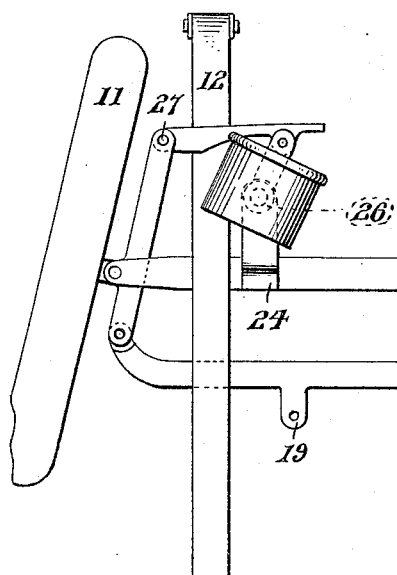
Figure 2:
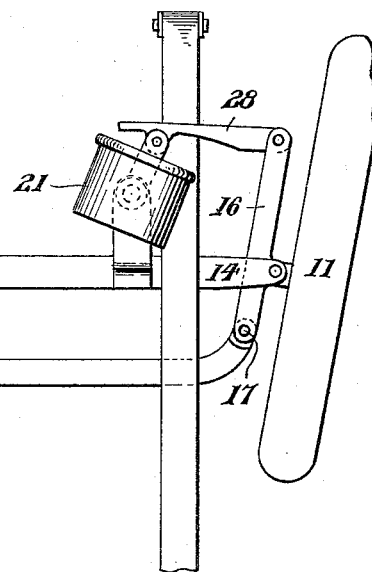
Figure 3:
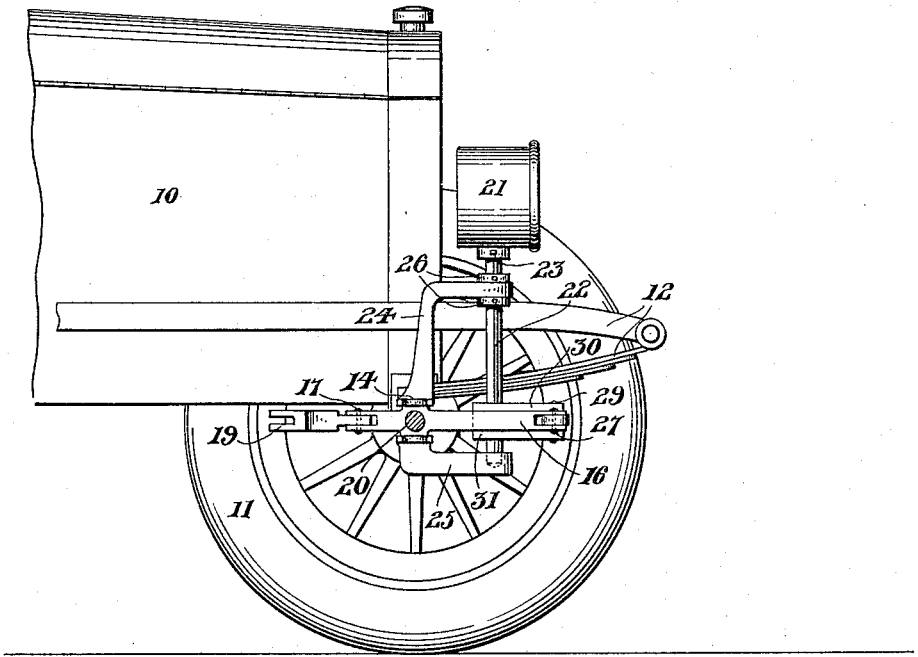
Figure 4:
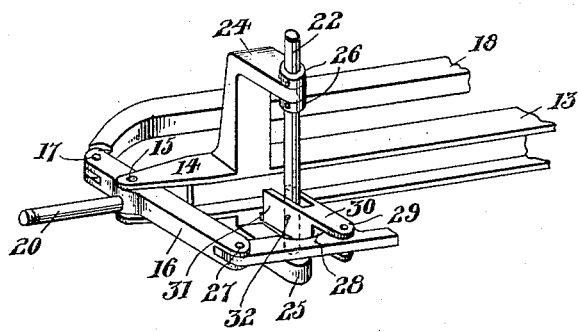

In the drawings forming a part of this application and in which like designating characters refer to corresponding parts throughout the several views:—Figure 1 is a top plan view of a portion of a motor vehicle built in accordance with the present invention with the head lights operatively connected to the steering mechanism, the wheels being positioned to travel in a straight direction. Fig. 2 is a top plan view similar to Fig. 1 with the steering wheels and head lights turned toward the light. Fig. 3 is a side elevational view of a portion of an automobile with the present invention in operative position thereon, and Fig. 4 is a detail perspective view of a portion of the steering mechanism illustrating the connection between the head lights and the steering mechanism.

Briefly described, the present invention aims to provide a device that is extremely simple in construction and inexpensive to manufacture, and one that may be readily attached to an automobile of the usual construction.

Referring more in detail to the accompanying drawings, the reference numeral 10 designates a portion of an automobile body and 11 the front steering wheels. The body 10 is supported on the usual springs 12 which in turn are connected to the front frame bar 13, preferably of angle iron construction as shown in Fig. 4.

Each end of the frame bar 13 is provided with a pair of spaced end extensions 14 carrying a pivotal pin 15 that supports a steering knuckle 16. The rear ends of the knuckles 16 are pivotally connected as at 17 to the ends of the steering shaft connecting rod 18, this construction being more clearly shown in Fig. 4. A rearwardly extending lug 19 is carried by the connecting rod 18 and is operatively associated with a steering shaft. Axle extensions 20 are carried by the steering knuckle 16 adjacent the pivot point 15 upon which the front steering wheels 11 are mounted.

A head light 21 is positioned at each side of the vehicle frame and is carried by a vertical standard 22 and fixed to the upper end thereof as at 23, the said standard being journaled in bracket arms 24 and 25 carried by the frame bar 13. The lower end of the shaft 22 is seated in a socket provided in the bracket arm 25 and is prevented from upward movement relative to the bracket arms by the collars 26 secured to the said rod on opposite sides of the upper bracket arm 24.

The outer end of the steering knuckle 16 is bifurcated and has pivotally mounted therein as at 27 one end of the link 28, the opposite end of the link having pivotally connected thereto as at 29 an arm 30 bifurcated as at 31 to adapt the same to straddle the lamp standard 22 and being fixed thereto by the pin 32.

From the above detailed description of the invention, it is believed that the operation thereof will be readily apparent, it being noted that the lamps 21 are adapted to move simultaneously with the change of direction of the steering wheels 11 by reason of the connection between the lamps and the connecting rod 18 for the steering mechanism. When the steering rod 18 is shifted, the knickle 16 is moved on its pivot 15 while the link 28 and arm 30 are simultaneously operated to oscillate the lamp standard 22 in either direction.

Obviously, many changes may be made in the details of construction without departing from the spirit and scope of the invention as claimed.

What we claim as new is:—

In combination with a motor vehicle provided with a transversely-extending forward frame bar; steering knuckles pivoted to the opposite ends of the frame bar and having forwardly and rearwardly-extending portions whereby said steering knuckles are substantially T-shaped in plan with the stems constituting journals for front steering wheels, a connecting rod pivoted to the rear ends of the heads of said T-shaped steering knuckles, brackets mounted on said frame bar adjacent the opposite ends thereof and projecting forwardly therefrom, lamps pivoted to the forward ends of said brackets and provided with forwardly-extending arms, and links connecting the forward ends of said T-shaped knuckles with the lamp arms whereby movement of the connecting rod effects movement of the lamps in parallelism to the wheels.

In testimony whereof we affix our signatures.

JUSTIN SAJDA.
MATTHEW SKAPICK.

Copies of this patent may be obtained for five cents each, by addressing the "Commissioner of Patents, Washington, D. C."